United States Patent
Wenners et al.

(10) Patent No.: US 11,668,392 B2
(45) Date of Patent: Jun. 6, 2023

(54) METHOD AND CONTROL UNIT FOR FREEING A VEHICLE BY ROCKING

(71) Applicant: ZF Friedrichshafen AG, Friedrichshafen (DE)

(72) Inventors: Manuel Wenners, Friedrichshafen (DE); Marco Freimuth, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/548,706

(22) Filed: Dec. 13, 2021

(65) Prior Publication Data

US 2022/0196144 A1 Jun. 23, 2022

(30) Foreign Application Priority Data

Dec. 17, 2020 (DE) ..................... 10 2020 216 134.8

(51) Int. Cl.
*F16H 59/18* (2006.01)
*F16H 61/02* (2006.01)
(Continued)

(52) U.S. Cl.
CPC ......... *F16H 61/0265* (2013.01); *F16H 59/18* (2013.01); *F16H 59/74* (2013.01);
(Continued)

(58) Field of Classification Search
CPC .......... F16H 59/18; F16H 59/66; F16H 59/74; F16H 2059/0221; F16H 61/0265; F16H 61/30; F16H 2312/08
See application file for complete search history.

(56) References Cited

U.S. PATENT DOCUMENTS

| 3,128,642 A | * | 4/1964 | Fisher | ................... B60W 10/10 192/221 |
| 4,982,620 A | * | 1/1991 | Holbrook | .............. B60W 10/04 192/3.3 |

(Continued)

FOREIGN PATENT DOCUMENTS

| DE | 10 2004 017 422 A1 | 10/2005 |
| DE | 10 2010 043 250 A1 | 5/2012 |
| DE | 10 2018 218 930 A1 | 5/2020 |

OTHER PUBLICATIONS

German Search Report Corresponding to 10 2020 216 134.8 dated May 28, 2021.

*Primary Examiner* — Edwin A Young
(74) *Attorney, Agent, or Firm* — Finch & Maloney PLLC

(57) ABSTRACT

A method for rocking a vehicle free. The vehicle comprises a drive aggregate (2), a transmission (4), shifting elements (10), and a starting element (5). The rocking free process is carried out as a function of actuation of an accelerator pedal (11) by the driver or a torque delivered by the drive aggregate (2) as a function of the actuation of the accelerator pedal. The shifting element (10) is controlled such that reduced actuation of the accelerator pedal or reduced torque delivered by the drive aggregate (2), reduces a control pressure of the shifting element (10) of the transmission (4) down to a filling pressure or a pressure that corresponds to the filling pressure, and increased actuation of the accelerator pedal or increased torque delivered by the drive aggregate (2), increases the control pressure of the shifting element (10) and the shifting element is operated in a slipping mode.

10 Claims, 1 Drawing Sheet

(51) Int. Cl.
*F16H 61/30* (2006.01)
*F16H 59/74* (2006.01)
F16H 59/66 (2006.01)
F16H 59/02 (2006.01)

(52) U.S. Cl.
CPC ............ *F16H 61/30* (2013.01); *F16H 59/66* (2013.01); *F16H 2059/0221* (2013.01)

(56) References Cited

U.S. PATENT DOCUMENTS

| | | | |
|---|---|---|---|
| 2003/0162618 A1* | 8/2003 | Hasegawa | B60K 5/00 475/72 |
| 2005/0235765 A1* | 10/2005 | Herbster | F16H 61/0246 74/336 R |
| 2008/0223680 A1* | 9/2008 | Hardtle | F16H 63/3023 192/31 |
| 2014/0206502 A1* | 7/2014 | Dix | F16H 61/66 477/68 |
| 2016/0195186 A1* | 7/2016 | Shamshiri | F16H 59/02 701/58 |

* cited by examiner

METHOD AND CONTROL UNIT FOR FREEING A VEHICLE BY ROCKING

This application claims priority from German Patent Application Serial No. 10 2020 216 134.8 filed Dec. 17, 2020.

FIELD OF THE INVENTION

The invention relates to a method for freeing a vehicle by rocking. In addition, the invention relates to a control unit of a vehicle.

BACKGROUND OF THE INVENTION

From DE 10 2018 218 930 A1 a method is known for operating a vehicle, namely for freeing the vehicle by rocking. A drive-train of the vehicle comprises a drive aggregate and a transmission connected between the drive aggregate and a drive output. The transmission comprises at least one shifting element, namely, at least one clutch. When a function for rocking the vehicle free is active, then to rock the vehicle free a clutch of the transmission is automatically controlled as a function of an actuation by the driver and as a function of a rotation speed of the drive output in such a manner that when, after the accelerator pedal has been actuated and the actuation of the accelerator pedal is reduced, the clutch is first disengaged with a defined first opening gradient, and then, as a function of a calculated point in time at which a torque acting from the drive aggregate upon the clutch corresponds quantitatively to a torque acting upon the clutch from the drive output, the disengaging of the clutch with a second opening gradient, which is smaller than the first opening gradient, is continued and, thereafter, when the value of a gradient of the rotation speed of the drive output is larger than a limit value, the engaging of the clutch with a defined first closing gradient begins. The engaging with the said first closing gradient is ended when the value of the gradient of the rotation speed of the drive output is smaller than a limit value.

SUMMARY OF THE INVENTION

There is a need for a new type of method for rocking a vehicle free, which is simple and can be used intuitively by the driver, in which vehicle a hydrodynamic starting element is connected between the drive aggregate and the transmission.

The purpose of the present invention is to provide a new type of method and a control unit for freeing a vehicle by rocking. This objective is achieved by a method for rocking a vehicle free according to the invention.

According to the invention, the rocking free of the vehicle is carried out when a function for rocking the vehicle free is activated. For this, as a function of an actuation of an accelerator pedal by the driver, or as a function of a torque delivered by the drive aggregate as a function of the actuation of the accelerator pedal by the driver, a frictional shifting element of the transmission that produces the frictional connection in a gear used for the rocking free process is actuated in a defined manner. Thus, the frictional shifting element of the transmission, which produces the frictional connection in the gear used for the rocking free process, is actuated in such a manner that when the accelerator pedal actuation by the driver is reduced, or when the torque delivered by the drive aggregate as a function of the actuation of the accelerator pedal by the driver is reduced, a control pressure of the frictional shifting element of the transmission is reduced to a filling pressure or to a pressure that corresponds to the filling pressure. When the accelerator pedal actuation by the driver is increased, or the torque delivered by the drive aggregate as a function of the actuation of the accelerator pedal by the driver is increased, the control pressure of the frictional shifting element of the transmission is increased and the clutch is operated in a slipping mode.

Preferably, when the function for the rocking free of the drive-train is activated, the actuation of the accelerator pedal by the driver is exclusively the only adjusting variable used by the driver.

In a reliable, simple and intuitive manner the method, according to the invention, allows the rocking free of a vehicle comprising a hydrodynamic starting element connected between the drive aggregate and the transmission. When the rocking free function is activated, the driver can rock the vehicle free exclusively by actuating the accelerator pedal. For this, the shifting element of the transmission that produces the frictional connection in the gear of the transmission, used for the rocking free process, is actuated with the defined control pressure as a function of the accelerator pedal actuation by the driver or as a function of the torque of the drive aggregate produced as a function of the accelerator pedal actuation by the driver.

Since with or as a result of the reduction of the accelerator pedal actuation by the driver, the control pressure of the frictional shifting element is reduced to the filling pressure or to the pressure that corresponds to the filling pressure, the vehicle can roll backward without the propulsive force of the hydrodynamic starting element acting upon the drive output. Furthermore, with or as a result of a subsequent increase of the accelerator pedal actuation by the driver, starting from the filling pressure or from the pressure that corresponds to the filling pressure, after a short reaction time the control pressure can be increased, so that with the frictional shifting element operating in the slipping mode, torque can promptly be transmitted in the direction of the drive output. The invention allows the accelerator pedal to be used similarly to an inverted clutch pedal. The vehicle can be rocked free in a simple and reliable manner.

Preferably, the torque delivered by the drive aggregate, that is a function of the actuation of the accelerator pedal by the driver, is limited to a value specified by the control system. Thanks to the torque limitation, overrunning of the drive output is prevented.

Preferably, the function of rocking the drive-train free is activated by the driver by actuating at least one operating element, such as a button or switch. This is preferred for activating the rocking free function.

The control unit according to the invention.

BRIEF DESCRIPTION OF THE DRAWINGS

Preferred further developments emerge from the subordinate claims and from the description that follows. Example embodiments of the invention, to which it is not limited, are explained in greater detail with reference to the drawing, which shows:

DETAILED DESCRIPTION OF THE PREFERRED EMBODIMENTS

Figure 1:
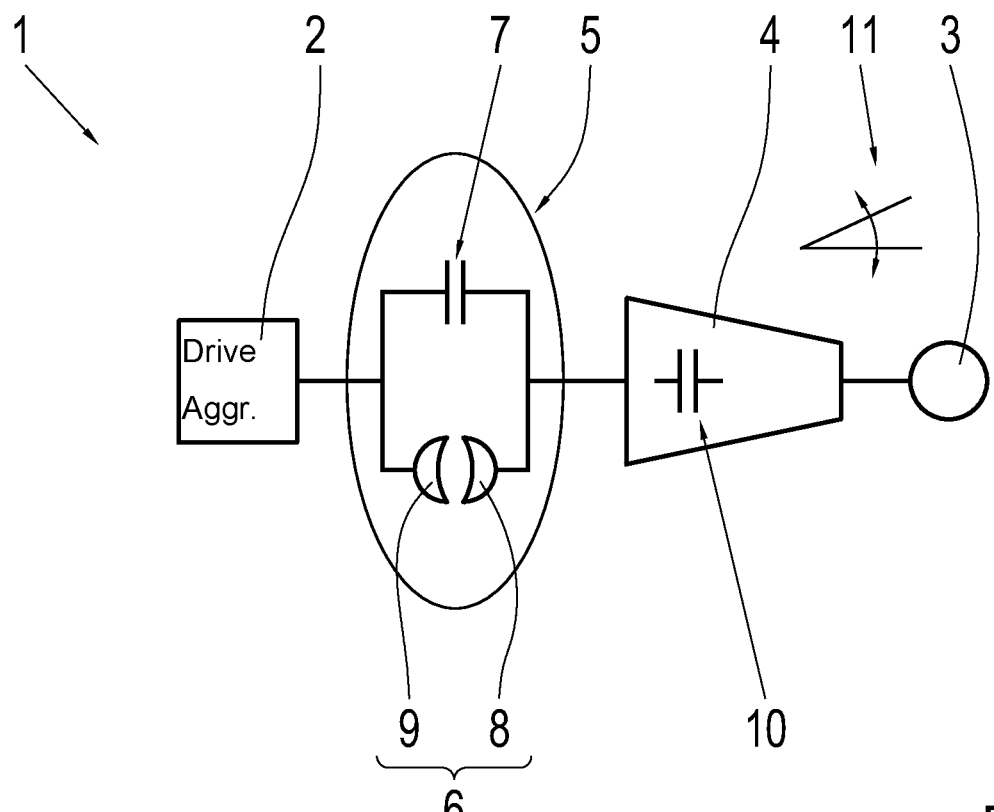
FIG. 1: A drive-train diagram of a vehicle.

The invention relates to a method and a control unit for operating a vehicle. FIG. 1 shows, very schematically, a drive-train 1 of a motor vehicle, wherein the drive-train 1 comprises a drive aggregate 2 and a transmission 4, connected between a drive output 3 and the drive aggregate 2. In addition, the drive-train 1 has a hydrodynamic starter element 5, which is connected between the drive aggregate 2 and the transmission 4. The hydrodynamic starter element 5 comprises a converter 6 and a converter lock-up clutch 7 connected parallel to the converter 6. A turbine wheel 8 and a pump wheel 9, of the converter 6, are shown.

The transmission 4 has a plurality of shifting elements 10, of which in FIG. 1 one shifting element 10 is shown as an example. A first number of shifting elements of the transmission 4 are engaged and a second number of shifting elements 10 of the transmission 4 are disengaged in each frictional gear of the transmission 4. The shifting elements 10 of the transmission 4 can be frictional and interlocking shifting elements. The frictional shifting elements are clutches and brakes. The interlocking shifting elements are claw-type shifting elements.

As already mentioned earlier, the invention relates to a method for rocking free a vehicle, wherein for the rocking free process a gear in the transmission 4 is used, namely, a gear in which the frictional connection is formed by engaging a frictional shifting element 10 of the transmission 4, wherein the hydrodynamic starting element 5 is connected between the transmission 4 and the drive aggregate 2.

According to the invention, when a function for rocking the drive-train 1 free is activated, the rocking free of the drive-train 1 is carried out, wherein for that purpose, as a function of an actuation of an accelerator pedal 11 by the driver, which pedal is also called the gas pedal, or as a function of a torque delivered by the drive aggregate 2 as a function of the actuation of the accelerator pedal by the driver, the frictional shifting element 10, which produces the frictional connection in the gear of the transmission 4 used for rocking free, is controlled in a defined manner.

The frictional shifting element 10, which produces the frictional connection in the gear used for the rocking free process, is controlled in a defined manner in such a way that when the accelerator pedal actuation by the driver is reduced, or when the torque delivered by the drive aggregate 2 as a function of the actuation of the accelerator pedal by the driver is reduced, a control pressure of the frictional shifting element 10 is automatically reduced, by a control unit, down to the filling pressure or to a pressure that corresponds to the filling pressure. For that, the control pressure is preferably reduced along a ramp to the filling pressure. In contrast, when the actuation of the accelerator pedal by the driver is increased, or when the torque delivered by the drive aggregate 2 as a function of the actuation of the accelerator pedal by the driver is increased, the control pressure of the frictional shifting element 10 is automatically increased by a control unit, from the filling pressure or from the pressure that corresponds to the filling pressure, and the said shifting element is operated in a slipping mode. For that, the control pressure is preferably increased along a ramp, and without completely engaging the frictional shifting element 10.

The invention allows an intuitive, reliable and simple rocking free process of a vehicle wherein, as the driver's adjusting variable or influencing variable, only accelerator pedal actuation by the driver is used or needed.

Further details of the invention are described with reference to FIG. 2, in which various curves, as a function of time, are shown. A time-related curve 12 visualizes the control pressure of a continuously closed shifting element 10 of the transmission 4 during the rocking free process. A time-related curve 13 visualizes the time variation either of the driver's accelerator pedal actuation or of a torque delivered by the drive aggregate 2 as a function of the driver's accelerator pedal actuation. A time-related curve 14 visualizes a control pressure of that shifting element 10 of the transmission 4 which forms the frictional connection in the transmission 4 during the rocking free process. A time-related curve 15 visualizes the time variation of a speed of the vehicle.

Figure 2:
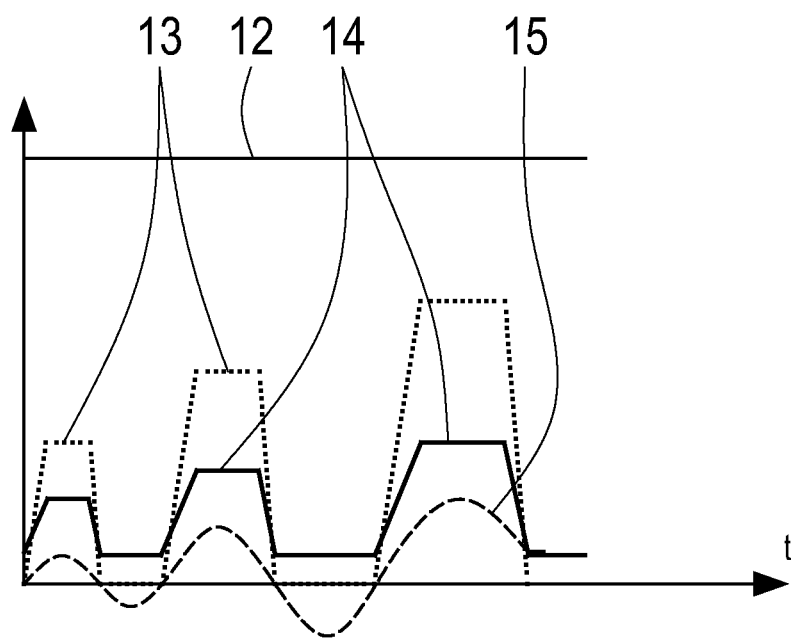
FIG. 2: A time diagram for further clarification of the method according to the invention for operating a vehicle.

It can be seen from FIG. 2 that when the driver's accelerator pedal actuation is increased or when the torque delivered by the drive aggregate 2, as a function of the driver's accelerator pedal actuation, is increased (see curve 13), the control pressure (see curve 14) of the frictional shifting element 10 is increased, whereas the shifting element is not fully engaged, but rather, operated in a slipping mode.

When the driver's accelerator pedal actuation or the torque delivered by the drive aggregate 2 as a function of the driver's accelerator pedal actuation is reduced (see curve 13), then the control pressure (see curve 14) of the frictional shifting element 10 is reduced, and this is down to the filling pressure or down to the pressure that corresponds to the filling pressure.

When the control pressure exactly equals the filling pressure, the frictional shifting element 10 is not fully disengaged, but rather, is operating at its contact point or biting point or touch-point, at which the shifting element 10 is engaged far enough for it to just not yet transmit any torque. If the accelerator pedal 11 is actuated no further, then the control pressure is or will be reduced to the filling pressure or to the pressure that corresponds to the filling pressure. The said pressure corresponding to the filling pressure can be lower than the filling pressure by a defined offset applied by the control system.

Thereafter, if the driver's accelerator pedal actuation is increased again or the torque delivered by the drive aggregate 2 as a function of the driver's accelerator pedal actuation is increased again (see curve 14), then starting from the filling pressure or starting from the pressure that corresponds to the filling pressure, the control pressure is increased, whereby time torque can be delivered to the drive output 3 within a very short.

As shown by the curve 14, the reduction of the control pressure and the increase of the control pressure preferably take place linearly along a ramp.

With a constant accelerator pedal actuation, the control pressure of the shifting element 10 also remains constant. If the accelerator pedal 11 is no longer being actuated or the actuation of the accelerator pedal 11 corresponds to an unactuated accelerator pedal condition, then the control pressure of the shifting element 10 corresponds to the filling pressure or a pressure that corresponds to the filling pressure.

When the frictional shifting element 10, that produces the force flow in the transmission 4 and is used for rocking free, is actuated with the filling pressure or with the pressure that corresponds to the filling pressure, it does not transmit any torque in the direction toward the drive output 3. The vehicle can then roll back unimpeded by any influence due to a so-termed converter propulsive force. Starting from the filling pressure or starting from the said pressure that corresponds to the filling pressure, the shifting element 10 can shift into the slipping mode within a very short time and can deliver torque to the drive output 3.

According to an advantageous further development of the invention, it is provided that the torque delivered by the drive aggregate 2 as a function of the accelerator pedal actuation by the driver is limited to a value specified by the control system, which value depends in particular on the condition of the road. This value for limiting the torque from the drive aggregate 2 during rocking free can be applied by the control system. Thus, the rocking free process can be adapted to suit the road condition in a simple manner.

The function for rocking the motor vehicle free is activated by the driver, preferably by actuating at least one operating element, such as a button or a switch. After the rocking free function has been activated, the rocking free is influenced by the driver exclusively by actuating the accelerator pedal 11.

The invention also relates to a control unit for carrying out the method according to the invention. The control unit is designed to carry out the method described above by control means.

The control unit used to carry out the method, according to the invention, is preferably a transmission control unit that controls and/or regulates the operation of the transmission 4. The operation of the drive aggregate 2 is controlled and/or regulated by a motor control unit. The transmission control unit exchanges data with the transmission 4 and the motor control unit exchanges data with the drive aggregate 2. The motor control unit and the transmission control unit can also exchange data with one another.

When the function for rocking free has been activated, then as a function of the driver's actuation of the accelerator pedal 11 or as a function of the torque delivered by the drive aggregate 2 as a function of the driver's actuation of the accelerator pedal, the control unit, according to the invention, controls the frictional shifting element 10 which produces the frictional connection in the gear used for rocking free as described above, namely, in such a manner that when the driver's actuation of the accelerator pedal or the torque delivered by the drive aggregate 2 as a function of the driver's actuation of the accelerator pedal is reduced, the control pressure of the frictional shifting element 10 is reduced to the filling pressure or to the pressure that corresponds to the filling pressure, while in contrast, when the driver's actuation of the accelerator pedal or the torque delivered by the drive aggregate 2 as a function of the driver's actuation of the accelerator pedal is increased, the control pressure of the frictional shifting element is increased and the shifting element is operated in a slipping mode.

The control unit is preferably an electronic control unit which comprises hardware and software means for carrying out the method according to the invention. The hardware means include data interfaces for exchanging data with the assemblies involved in carrying out the method according to the invention, such as the motor control unit which provides information about the torque delivered by the drive aggregate and with the shifting element, which is controlled by the transmission control unit. The hardware means also include a memory for storing data and a processor for data processing. The software means include program modules which are implemented in the control unit for carrying out the method according to the invention.

INDEXES

1 Drive-train
2 Drive aggregate
3 Drive output
4 Transmission
5 Starting element
6 Converter
7 Converter lock-up clutch
8 Turbine wheel
9 Pump wheel
10 Shifting element
11 Accelerator pedal
12 Control pressure
13 Torque
14 Control pressure
15 Speed

The invention claimed is:

1. A method for rocking a vehicle free, the vehicle having a drive aggregate, a transmission comprising a plurality of shifting elements that are connectable between the drive aggregate and a drive output, and a hydrodynamic starting element with a converter, in each friction-locking gear of the transmission, a first number of the shifting elements of the transmission are engaged and a second number of the shifting elements are disengaged, the method comprising:
when a function for rocking free is activated, carrying out the rocking free method as a function of an actuation of an accelerator pedal by a driver or as a function of a torque delivered by the drive aggregate as a function of the actuation of the accelerator pedal by the driver,
controlling a frictional shifting element of the transmission that forms a frictional connection, in a gear used for the rocking free method, in such a manner that:
when the actuation of the accelerator pedal by the driver or the torque delivered by the drive aggregate as a function of the actuation of the accelerator pedal by the driver is reduced, reducing a control pressure of the frictional shifting element of the transmission down to a filling pressure or a pressure that corresponds to the filling pressure, and
when the actuation of the accelerator pedal by the driver or the torque delivered by the drive aggregate as a function of the actuation of the accelerator pedal by the driver is increased, increasing the control pressure of the frictional shifting element of the transmission and operating the shifting element in a slipping mode.

2. The method according to claim 1, further comprising, when the actuation of the accelerator pedal by the driver or the torque delivered by the drive aggregate as a function of the actuation of the accelerator pedal by the driver is reduced, reducing the control pressure of the frictional shifting element along a ramp down to the filling pressure or the pressure that corresponds to the filling pressure.

3. The method according to claim 1, further comprising, when the actuation of the accelerator pedal by the driver or the torque delivered by the drive aggregate as a function of the actuation of the accelerator pedal by the driver is increased, increasing the control pressure of the frictional shifting element, starting from the filling pressure or the pressure that corresponds to the filling pressure, along a ramp.

4. The method according to claim 1, further comprising, limiting the torque delivered by the drive aggregate, as a function of the actuation of the accelerator pedal by the driver, to a value specified by a control system.

5. The method according to claim 4, wherein the value specified by the control system to which the torque delivered by the drive aggregate as a function of the actuation of the accelerator pedal by the driver is limited, is specified as a function of a road condition.

6. The method according to claim 1, wherein the rocking free function is activated by the driver by actuating at least one operating button or switch.

7. The method according to claim 1, wherein when the rocking free function has been activated, only the actuation of the accelerator pedal by the driver is used as an adjusting variable by the driver.

8. A control unit of a vehicle,
wherein, when a rocking free function has been activated, then as a function of an actuation of an accelerator pedal by a driver or as a function of a torque delivered by a drive aggregate as a function of the actuation of the accelerator pedal by the driver, the control unit controls a frictional shifting element of a transmission of the vehicle that produces a frictional connection in a gear used for a rocking free method, in such a manner that
when the actuation of the accelerator pedal by the driver or the torque delivered by the drive aggregate, as a function of the actuation of the accelerator pedal by the driver is reduced, the control unit reduces a control pressure of the frictional shifting element down to a filling pressure or a pressure that corresponds to the filling pressure, and
when the actuation of the accelerator pedal by the driver or the torque delivered by the drive aggregate as a function of the actuation of the accelerator pedal by the driver is increased, the control unit increases the control pressure of the frictional shifting element and operates the shifting element in a slipping mode,
wherein the control unit is designed to carry out the rocking free method according to claim 1.

9. A control unit of a vehicle,
wherein, when a rocking free function has been activated, then as a function of an actuation of an accelerator pedal by a driver or as a function of a torque delivered by a drive aggregate as a function of the actuation of the accelerator pedal by the driver, the control unit controls a frictional shifting element of a transmission of the vehicle that produces a frictional connection in a gear used for the rocking free function, in such a manner that
when the actuation of the accelerator pedal by the driver or the torque delivered by the drive aggregate, as a function of the actuation of the accelerator pedal by the driver is reduced, the control unit reduces a control pressure of the frictional shifting element down to a filling pressure or a pressure that corresponds to the filling pressure, and
when the actuation of the accelerator pedal by the driver or the torque delivered by the drive aggregate as a function of the actuation of the accelerator pedal by the driver is increased, the control unit increases the control pressure of the frictional shifting element and operates the shifting element in a slipping mode.

10. The control unit according to claim 9, wherein the control unit is designed to carry out a method of rocking free a vehicle.

* * * * *